(12) United States Patent
Alcantar et al.

(10) Patent No.: US 10,166,528 B1
(45) Date of Patent: Jan. 1, 2019

(54) AMMONIA REMOVAL IN FRESHWATER AND SALTWATER SYSTEMS

(71) Applicants: Norma A. Alcantar, Tampa, FL (US); Wen Zhao, Temple Terrace, FL (US); Sarina Joy Ergas, Tampa, FL (US)

(72) Inventors: Norma A. Alcantar, Tampa, FL (US); Wen Zhao, Temple Terrace, FL (US); Sarina Joy Ergas, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/023,396

(22) Filed: Jun. 29, 2018

Related U.S. Application Data

(63) Continuation-in-part of application No. 14/997,793, filed on Jan. 18, 2016.

(Continued)

(51) Int. Cl.
| | |
|---|---|
| B01J 20/16 | (2006.01) |
| B01J 20/34 | (2006.01) |
| B01J 39/14 | (2006.01) |
| C02F 1/42 | (2006.01) |
| A01K 63/04 | (2006.01) |
| B01J 20/30 | (2006.01) |
| C02F 101/16 | (2006.01) |

(52) U.S. Cl.
CPC .......... B01J 20/3071 (2013.01); A01K 63/04 (2013.01); B01J 20/165 (2013.01); B01J 39/14 (2013.01); C02F 1/42 (2013.01); C02F 2001/425 (2013.01); C02F 2101/16 (2013.01)

(58) Field of Classification Search
CPC ...... C02F 1/281; C02F 1/42; C02F 2001/425; C02F 2101/16; B01J 20/16; B01J 20/165; B01J 20/3071; B01J 39/02; B01J 39/14; B01J 49/60; A01K 63/04; A01K 63/045

See application file for complete search history.

(56) References Cited

U.S. PATENT DOCUMENTS

| | | | |
|---|---|---|---|
| 5,489,323 A | 2/1996 | Yoshida | |
| 2018/0194643 A1* | 7/2018 | Litz | ............ C02F 1/42 |

FOREIGN PATENT DOCUMENTS

| | | |
|---|---|---|
| EP | 0072147 A1 | 2/1983 |
| GB | 2245809 A | 1/1992 |

OTHER PUBLICATIONS

M. Orr, What Does That Number Really Mean? Aquarium Water Testing Methods, Results and Interpretation, Sea Scope, 2008, vol. 24, pp. 1-2.

(Continued)

*Primary Examiner* — Matthew O Savage
(74) *Attorney, Agent, or Firm* — Michele L. Lawson; Smith & Hopen, P.A.

(57) ABSTRACT

An ammonia adsorption product is described which may be used for fresh caught fish and bait. The product may comprise functionalized tectosilicate compound and a buffer. High concentrations of ammonia produced by fish waste can be lethal, even though oxygen availability is rich enough to keep fish breathing. The product is a user-friendly, sustainable, affordable product which is able to extend the life of the fish by safely removing ammonia by an ion-exchange mechanism. This product can convert toxic ammonia into ammonium and uptake ammonium by releasing sodium ions in the water.

6 Claims, 9 Drawing Sheets

Related U.S. Application Data

(60) Provisional application No. 62/104,398, filed on Jan. 16, 2015.

(56) References Cited

OTHER PUBLICATIONS

R. M. Durborow, D. M. Crosby and M. W. Brunso, "Ammonia in Fish Ponds," Southern Regional Aquaculture Center, 1992, No. 463.
S. S. Verma, "Wonders of Zeolite," Chemical Business, 2012, 26(2), pp. 10-12.

* cited by examiner

FIG. 5A-B

AMMONIA REMOVAL IN FRESHWATER AND SALTWATER SYSTEMS

CROSS-REFERENCE TO RELATED APPLICATIONS

The present application is a continuation in part of and claims priority to currently U.S. Nonprovisional patent application Ser. No. 14/997,793, filed Jan. 18, 2016, entitled "Ammonia Removal in Freshwater and Saltwater Systems", which claims priority to U.S. Provisional Patent Application Ser. No. 62/104,398, filed Jan. 16, 2015, entitled "Ammonia Removal in Freshwater and Saltwater Systems", each of which are incorporated herein by reference their entireties.

FIELD OF THE INVENTION

This invention relates to removal of contaminates from water, and more specifically to systems and methods for removing ammonia from freshwater and saltwater environments to extend the life expectancy of stored fish.

BACKGROUND OF THE INVENTION

Freshwater and saltwater fishing are some of the most popular outdoor activities in the United States and throughout the world. Caught fish are often kept alive by placing the fish in a bucket, livewell, or other container or closed system. In addition, live bait is often used for fishing and must be kept in a similar container prior to use. Because the volume of water is limited in these closed systems, an aeration pump is often installed to replenish dissolved oxygen levels in the water. While aeration systems may maintain oxygen levels in the water to sustain the fish, other contaminates may build up in the closed system and poison the fish. For example, waste products discharged by the fish may increase ammonia concentration in the water and may build to levels that will kill the fish despite an adequate level of dissolved oxygen in the water. Traditional methods to control ammonia in these types of closed systems include lowering the pH of the water or introducing new water to the system (that is, diluting the ammonia concentration).

Accordingly, what is needed in the art is a user friendly, sustainable, cost-effective, and capable system and method for reducing the ammonia level if fresh and saltwater systems.

SUMMARY OF INVENTION

The present invention provides systems and methods for removing ammonia from freshwater and saltwater environments. Various embodiments may comprise a treated, functionalized zeolite compound with a high ammonium absorption capacity. Zeolites are microporous mineral compounds commercially used as adsorbents. The porous structure can accommodate a wide variety of cations such as Nat, $Ca^{2+}$, $K^+$, and $Mg^{2+}$. In addition, once these cations are adsorbed by the zeolite, they can be exchanged for other cations when the zeolite is in contact with a solution containing the other cations. While there are a large number of available zeolites, various embodiments comprise chabazite because it is inexpensive, readily available from many areas of the world, and has a cation-exchange capacity.

An exemplary method for producing an ammonia removal agent for water environments may comprise obtaining a tectosilicate compound. The tectosilicate compound may be functionalized by soaking the tectosilicate compound in a freshwater solution or sodium chloride solution and removing ions from the tectosilicate compound that have a lower ion selectivity than ammonium ions. The functionalized tectosilicate compound may be washed in deionized water and then dried. A pH buffer may be added to the functionalized tectosilicate compound.

An exemplary method for controlling an ammonia level in a water environment may comprise providing a functionalized tectosilicate compound. The functionalized tectosilicate compound may be produced by first obtaining a tectosilicate compound. The tectosilicate compound may be functionalized by soaking the tectosilicate compound in a freshwater solution or sodium chloride solution and removing ions from the tectosilicate compound that have a lower ion selectivity than ammonium ions. The functionalized tectosilicate compound may be washed in deionized water and then dried. A pH buffer may be added to the functionalized tectosilicate compound. A porous container that allows liquid to flow through the container may be provided for the functionalized tectosilicate compound. The container of functionalized tectosilicate compound may be placed in a water environment comprising a source of ammonia. The pH buffer may buffer the pH of the system to about 7 and shift an equilibrium between ammonia and ammonium in the water environment towards ammonium. The ammonium may be adsorbed by the functionalized tectosilicate.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Caught fish are often kept alive by placing the fish in a bucket, livewell, or other container or closed system. In addition, live bait is often used for fishing and must be kept in a similar container prior to use. Because the volume of water is limited in these close systems, an aeration pump is often installed to replenish dissolved oxygen levels in the water. While aeration systems may maintain oxygen levels in the water to sustain the fish, other contaminates may build up in the closed system and poison the fish. For example, waste products discharged by the fish may increase ammonia concentration in the water and may build to levels that will kill the fish despite an adequate level of dissolved oxygen in the water.

Various embodiments may comprise one or more treated, functionalized zeolite compounds with a high ammonium absorption capacity. Zeolites are microporous mineral compounds commercially used as adsorbents. The porous structure can accommodate a wide variety of cations such as Nat, $Ca^{2+}$, $K^+$, and $Mg^{2+}$. In addition, once these cations are adsorbed by the zeolite, they can be exchanged for other cations when the zeolite is in contact with a solution containing the other cations. While there are a large number of available zeolites, various embodiments comprise chabazite because it is inexpensive, readily available from many areas of the world, and has a cation-exchange capacity. Chabazite (available from St. Cloud Mining Company) is a tectosilicate mineral with the formula $(Ca,Na_2,K_2,Mg)Al_2Si_4O_{12}\cdot 6H_2O$.

The ion selectivity series for chabazite is:

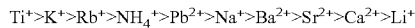

$Ti^+>K^+>Rb^+>NH_4^+>Pb^{2+}>Na^+>Ba^{2+}>Sr^{2+}>Ca^{2+}>Li^+$

Thus, chabazite that has been functionalized with a common and readily available ion such as $Na^+$ will tend to give up the $Na^+$ ion in favor of $NH_4^+$ (ammonium). This property can be exploited to use $Na^+$ functionalized chabazite to selectively remove ammonium from water.

Figure 1:
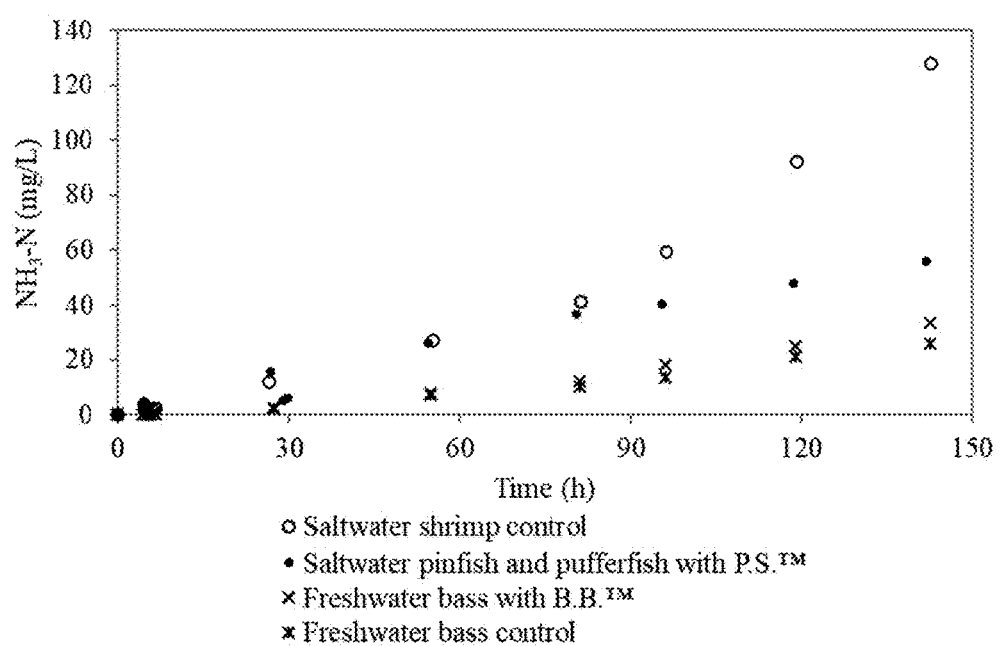
FIG. 1 is a graph of ammonia buildup in a closed aquatic system for a variety of fish.

Experimentation was conducted to determine the ammonia accumulation rate over time for closed systems of various volumes containing live fish in both freshwater and saltwater. These tests involved bass with a commercial water conditioner, bass without the conditioner, pinfish and blowfish, and shrimp. Ammonia concentration was determined using the salicylate method (HACH Method 10031) and the results are shown in FIG. 1. These tests indicated an ammonia accumulation rate of 0.21±0.03 mg $HN_3$—N/specimen/hr for freshwater fish and 0.81±0.17 mg $HN_3$—N/specimen/hr for saltwater fish.

Next, a procedure was developed to treat and functionalize chabazite pellets to maximize ammonium adsorption capacity. Chabzite pellets having a size range of 1-2 mm were washed in deionized (DI) water using a shaker table for 24 hours to remove small particles. The washed pellets were then oven dried at 110° C.

Two pretreatment methods were used to develop products specific to freshwater and saltwater uses. For freshwater uses, the washed and dried chabazite was soaked in freshwater/synthetic freshwater for 24 hours to remove sodium ions, then washed with DI water and oven dried at 110° C. for 5 hours. The composition of the synthetic freshwater is provided in Table 1. For saltwater uses, the washed and dried chabazite was soaked in a 2M NaCl solution for 24 hours to uptake sodium ions, then washed with DI water and oven dried at 110° C. for 5 hours.

TABLE 1

Synthetic Freshwater Composition

| Ion | Freshwater (g/L) |
|---|---|
| Sodium (Na+) | 0.075 |
| Potassium (K+) | 0.00312 |
| Magnesium (Mg2+) | 0.024 |
| Chloride (Cl−) | 0.193 |
| Calcium (Ca2+) | 0.043 |
| Bicarbonate (HCO3−) | 0.0048 |
| Sulfate (SO42−) | 0.096 |
| Alkalinity | 0.310 |

Figure 2:
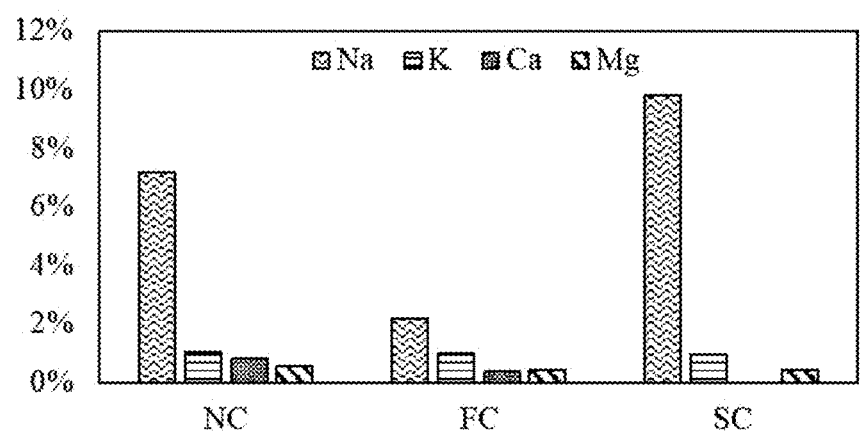
FIG. 2 is a graph of the composition of chabazite before and after pretreatment.

FIG. 2 shows the chemical composition of the chabazite before and after treatment. The $Na^+$ composition decreased sharply for the treated freshwater chabazite (CF in FIG. 2) and a less sharp increase in $Na^+$ composition for the saltwater chabazite (CS in FIG. 2). Approximately half of the $Ca^{2+}$ ions were released from the freshwater chabazite and essentially all $Ca^{2+}$ was released from the saltwater chabazite. There was no appreciable change in the $K^+$ and $Mg^{2+}$ composition.

The functionalized chabazite was then coated with an environmentally friendly blue dye (PSP0002 Lake and Pond Dye available from Outdoor Water Solutions).

Figure 3:
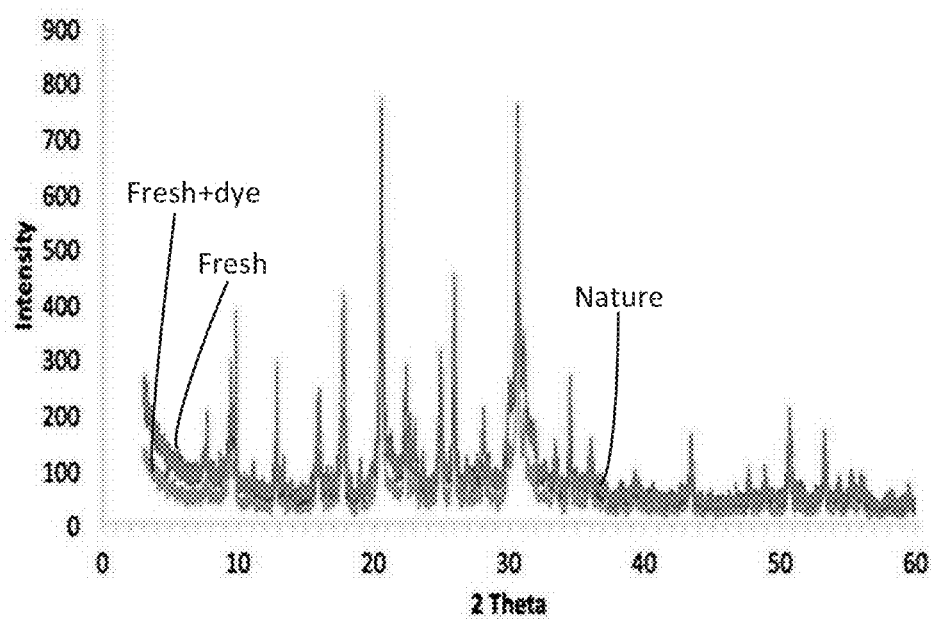
FIG. 3 is an x-ray diffraction plot of chabazite pretreated using freshwater.
Figure 4:
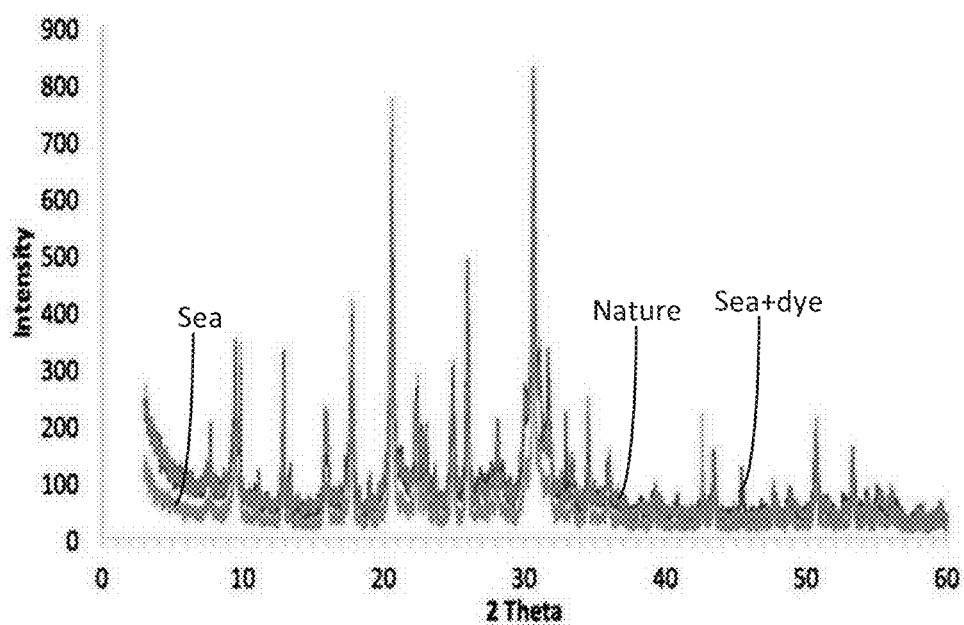
FIG. 4 is an x-ray diffraction plot of chabazite pretreated using 2M NaCl.

FIGS. 3 and 4 illustrate that the crystalline structure of the freshwater chabazite and the saltwater chabazite, respectively, are unchanged after treatment. The additional peaks evident in FIG. 4 are due to the presence of the blue dye.

Figure 5:
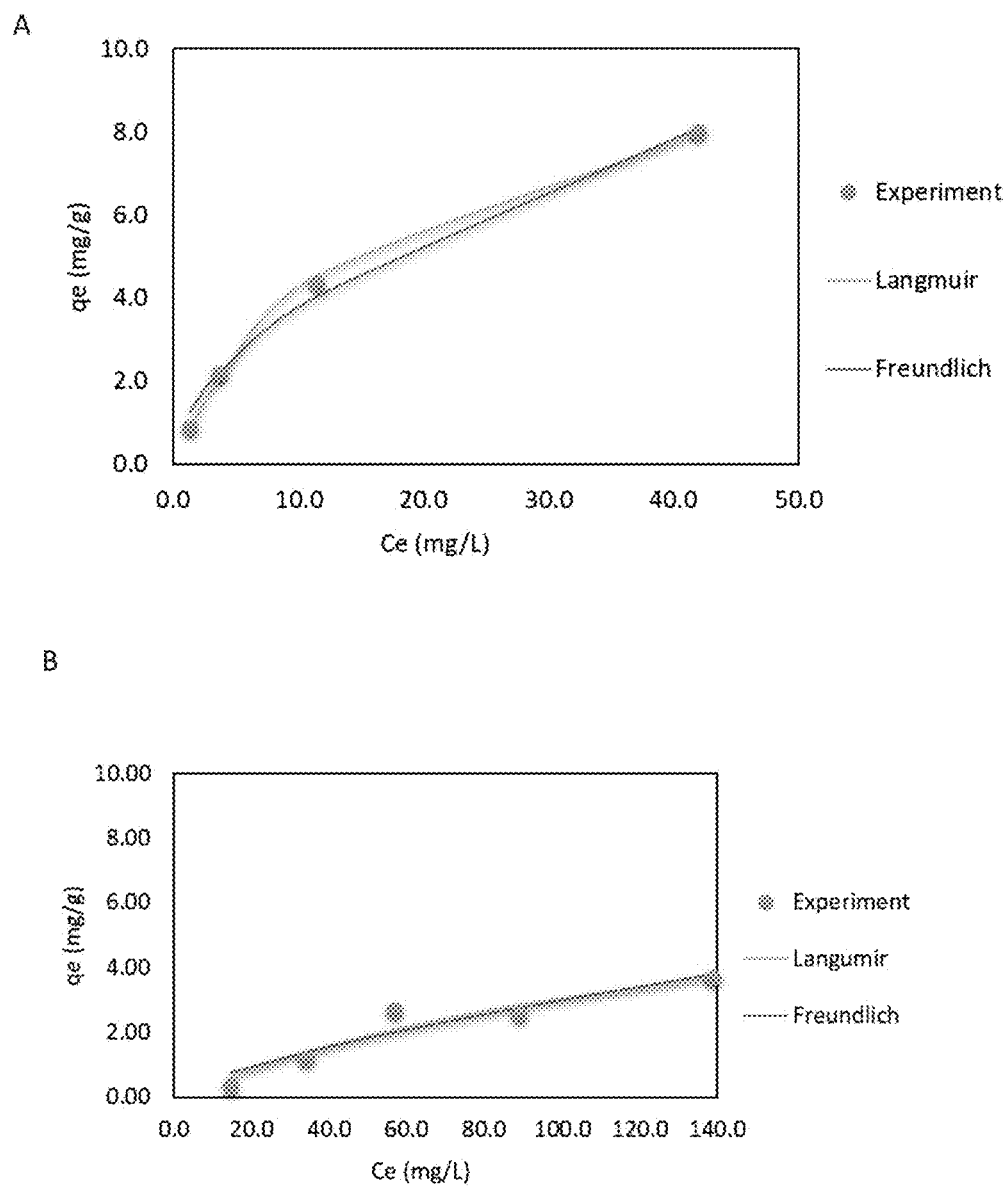
FIG. 5A is a graph of the ammonium adsorption nonlinear isotherm in freshwater
FIG. 5B is a graph of the ammonium adsorption nonlinear isotherm in saltwater

The ammonium adsorption isotherm using the Langmuir and Freundlich models were then determined for both the freshwater and saltwater chabazite. This testing was performed using the synthetic freshwater characterized in Table 1 and synthetic saltwater (available from Instant Ocean) characterized in Table 2. The ammonium adsorption isotherm results are presented in FIGS. 5A and 5B (nonlinear isotherm) and Table 3.

TABLE 2

Synthetic Saltwater Composition

| Ion | Saltwater (g/L)7 |
|---|---|
| Sodium (Na+) | 10.780 |
| Potassium (K+) | 0.42 |
| Magnesium (Mg2+) | 1.32 |
| Chloride (Cl−) | 19.290 |
| Calcium (Ca2+) | 0.400 |
| Bicarbonate (HCO3−) | 0.200 |
| Sulfate (SO42−) | 2.66 |
| Alkalinity | 0.241 |

TABLE 3

Isotherm Constants for Ammonium Adsorption in Both Freshwater and Saltwater

| | | Langmuir | | | Freundlich | | |
|---|---|---|---|---|---|---|---|
| | | $q_o$ (mg/g) | b (L/mg) | $R^2$ | K | 1/n | $R^2$ |
| Linear | Freshwater | 10.83 | 0.07 | 0.99 | 0.85 | 0.63 | 0.98 |
| | Saltwater | 38.91 | 0.001 | 0.024 | 0.027 | 1.038 | 0.92 |
| Non-linear | Freshwater | 11.10 | 0.06 | 0.99 | 1.10 | 0.54 | 0.99 |
| | Saltwater | 7.80 | 0.006 | 0.92 | 0.11 | 0.72 | 0.90 |

Figure 6:
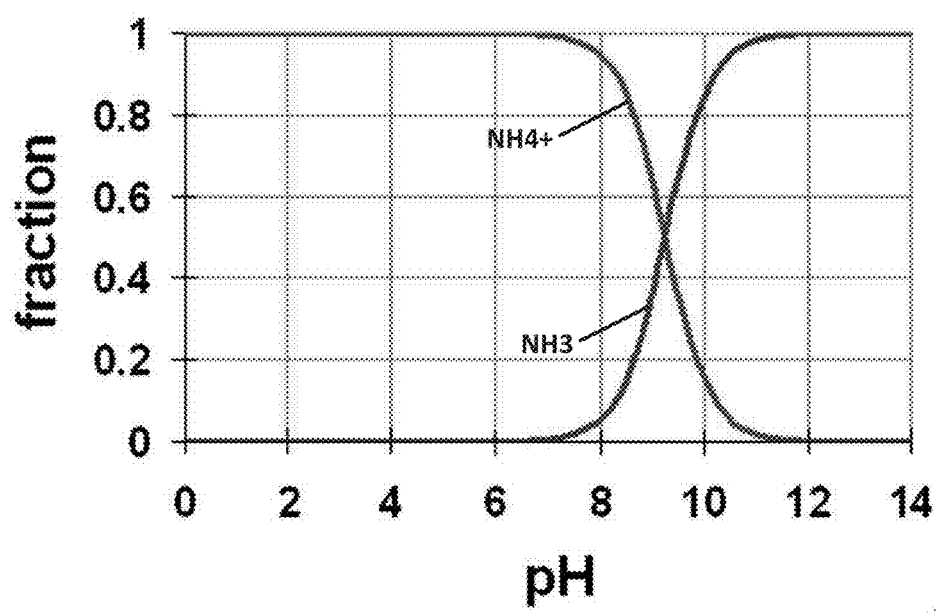
FIG. 6 illustrates the relationship of ammonia to ammonium concentration as a function of pH.

Proper pH control may be used to affect the ammonia chemistry according to the equation $NH_3+H^+\leftrightarrow NH_4^++H_2O$. The higher the pH, the more the equilibrium moves to the left, favoring ammonia formation. The lower the pH, the more the equilibrium is shifted to the right, favoring ammonium formation. As shown in FIG. 6, a pH of about 7 favors essentially 100 percent formation of ammonium. To achieve a pH of 7, a buffer comprising $Na_2HPO_4$ and $NaH_2PO_4$ were added to both the freshwater and saltwater chabazite.

Product preparation steps are summarized as follows:

Freshwater Chabazite

1. Chabazite (30 g) pretreated by synthetic freshwater at for 24 hrs (200 mL synthetic freshwater and 1 mL 5 g/L blue dye solution).

2. Wash by DI water and dry in the oven at 110° C. for 5 hours.
3. Mix with 0.8 $Na_2HPO_4$ and 0.3 g $NaH_2PO_4$.
4. Pack in a porous bag (30 g per bag).

Saltwater Chabazite
1. Chabazite (30 g) pretreated by 2M NaCl for 24 hrs (200 mL 2M NaCl and 1 mL 5 g/L blue dye solution).
2. Wash by DI water and dry in the oven at 110° C. for 5 hours.
3. Mix with 0.8 $Na_2HPO_4$ and 0.3 g $NaH_2PO_4$.
4. Pack in a porous bag (30 g per bag).

Figure 7:
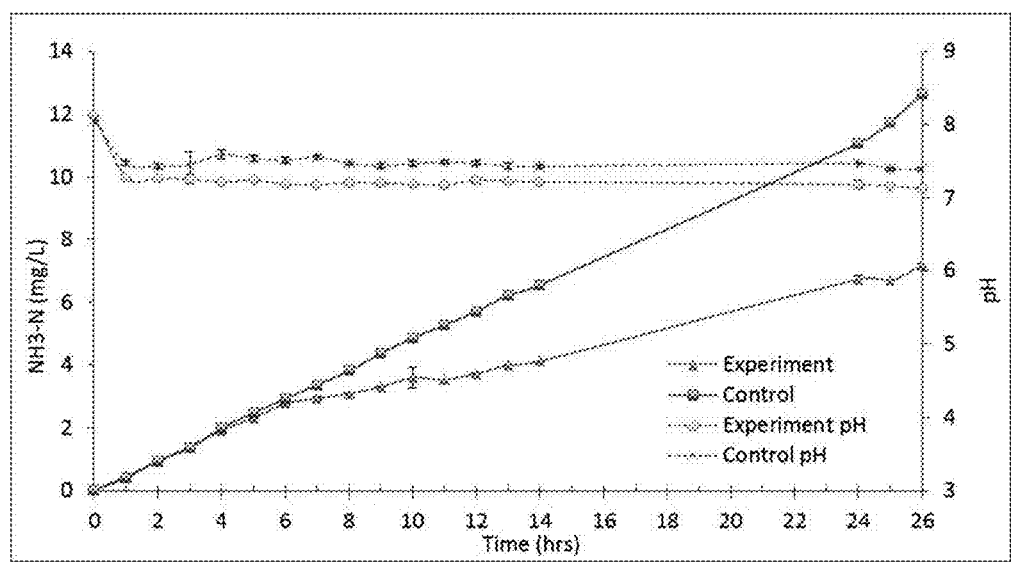
FIG. 7 is a graph of ammonia concentration for an in-vitro experiment.
Figure 8:
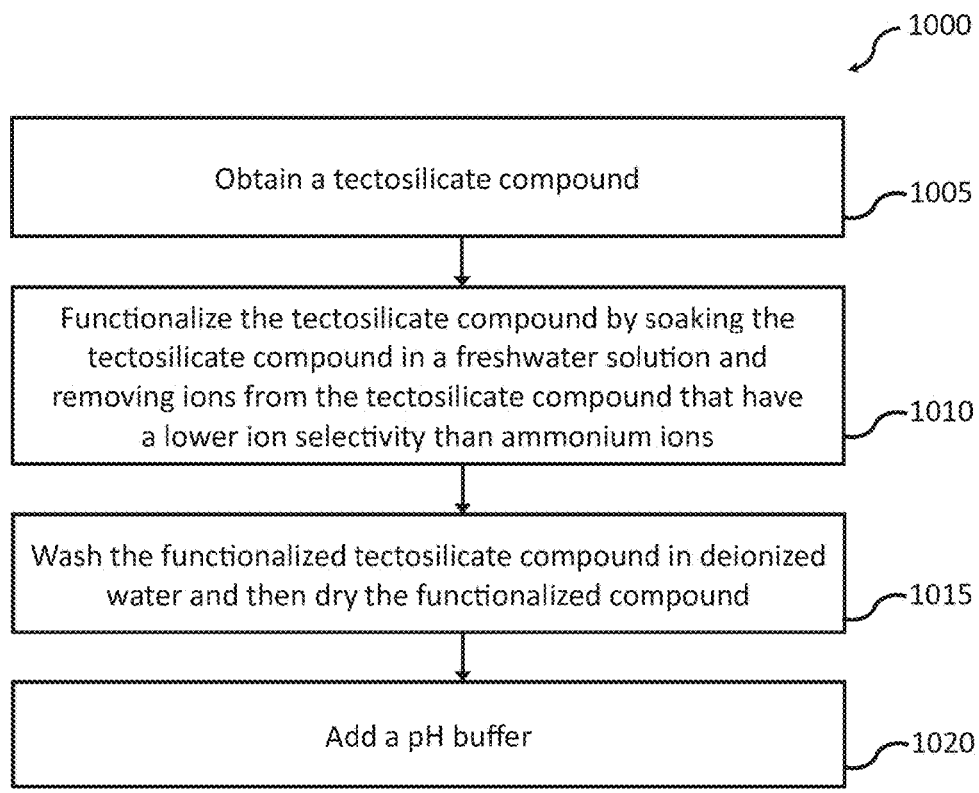
FIG. 8 is a flowchart of an exemplary method for producing an ammonia removal agent for water environments.
Figure 9:
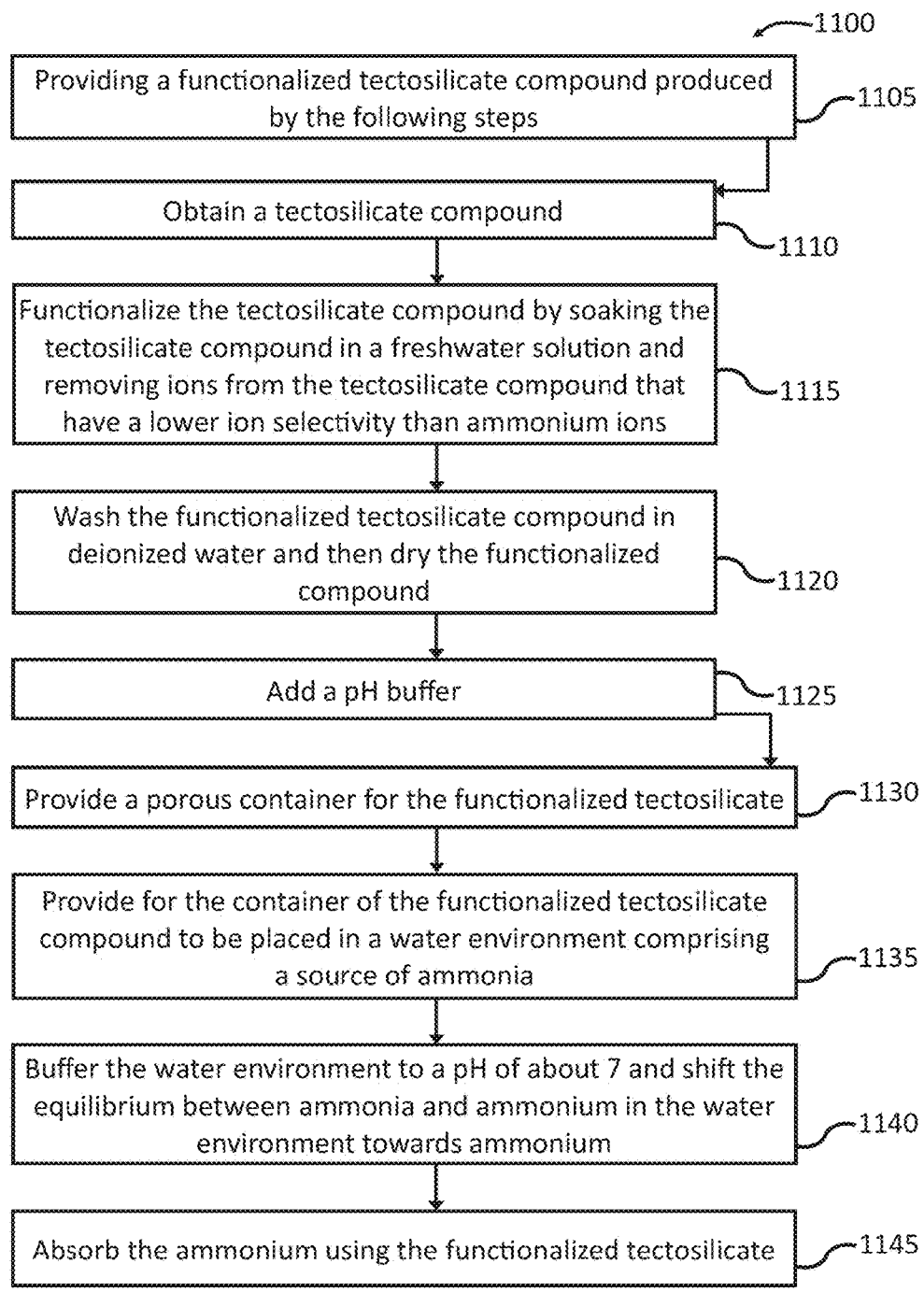
FIG. 9 is a flowchart of an exemplary method for controlling an ammonia level in a water environment.

Using the above preparation steps, porous containers of the freshwater chabazite were prepared and an in-vitro test was conducted using synthetic freshwater. A high-performance ammonia ion selective electrode was used to measure ammonia concentration in a container with the freshwater chabazite in a porous bag and a control. Aeration was used in both. The experimental results are shown in FIG. 7. For the experimental specimen, $k_{experimental}$=0.25±0.02 mg $NH_3$—N/L/h. For the control specimen, $k_{control}$=0.47±0.01 mg $NH_3$—N/L/h.

In-vivo tests were then performed using live fish in an experimental container with the prepared chabazite and live fish in a container without chabazite as a control. Aeration was used in both. Prepared chabazite was added into water every three hours. Testing was performed for both freshwater and saltwater systems. In freshwater, functionalized chabazite removed 18.9±4.8% of $NH_3$—N within 24 hours. In seawater, functionalized chabazite was ineffective.

In various embodiments, spent chabazite may be regenerated by removing the adsorbed ammonium ions and replacing them with sodium ions (or other suitable ions).

Table 4 presents the cost of materials for the chabazite system. The total cost compares favorably to commercial water conditioners which range from $4-10.

TABLE 4

Material Costs for Chabazite, Dye, and Buffer

| Component | Cost/Day |
|---|---|
| Chabazite | $1.48 |
| Dye | $0.77 |
| Buffer | $0.13 |
| Bag | $0.64 |
| Other | $0.50 |
| TOTAL | $3.53 |

DEFINITION OF CLAIM TERMS

Ammonium: a positively charged polyatomic ion with the chemical formula $NH_4^+$. It may be formed by the protonation of ammonia ($NH_3$).

Buffer: an aqueous solution consisting of a mixture of a weak acid and its conjugate base, or vice versa. Its pH changes very little when a small or moderate amount of strong acid or base is added to it and thus it may be used to prevent changes in the pH of a solution.

Chabazite: a tectosilicate mineral with the formula $(Ca, Na_2, K_2, Mg)Al_2Si_4O_{12}\cdot 6H_2O$.

Functionalize: to change surface properties of a material by adding or removing functional groups.

Ion selectivity: the affinity a compound shows for reacting with different ions. An ion with a higher ion selectivity will tend to displace an ion in the compound that has a lower ion selectivity.

Tectosilicate compound: a silicates compound having a three-dimensional framework of silicate tetrahedra with $SiO_2$ or a 1:2 ratio.

REFERENCES

[1] D. W. Breck, "Zeolite Molecular Sieves: Structure, Chemistry, and Use." Wiley, New York. 1974.
[2] M. Orr, "What Does That Number Really Mean? Aquarium Water Testing Methods, Results and Interpretation, Sea Scope, 2008, vol. 24, pp 1-2.
[3] R. M. Durborow, D. M. Crosby and M. W. Brunso, "Ammonia in Fish Ponds," Southern Regional Aquaculture Center, 1992, No. 463.
[4] S. S. Verma, "Wonders of Zeolite," Chemical Business, 2012, 26(2), pp. 10-12.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for producing an ammonia removal agent for water environments, comprising:
obtaining a tectosilicate compound wherein the tectosilicate compound is chabazite;
functionalizing the tectosilicate compound, comprising soaking the tectosilicate compound in a synthetic freshwater solution for 24 hours and removing ions from the tectosilicate compound that have a lower ion selectivity than ammonium ions wherein the synthetic freshwater solution consists of:
0.075 g/L of sodium;
0.00312 g/L of potassium;
0.024 g/L of magnesium;
0.193 g/L of chloride
0.043 g/L of calcium;
0.0048 g/L of bicarbonate;
0.096 g/L of sulfate; and
0.310 g/L of alkalinity;
washing the functionalized tectosilicate compound in deionized water; and
drying the functionalized tectosilicate compound.

2. The method of claim 1, further comprising washing the tectosilicate compound in deionized water and drying the tectosilicate compound prior to soaking the tectosilicate compound in the synthetic freshwater solution.

3. The method of claim 2, wherein the tectosilicate compound is washed using a shaker table for 24 hours to remove small particles.

4. The method of claim 1, wherein removing ions from the tectosilicate compound comprises removing sodium ions from the tectosilicate compound.

5. The method of claim 4, wherein functionalizing the tectosilicate compound reduces a percentage of sodium ionically bound to the compound by at least 50 percent.

6. The method of claim 1, wherein the functionalized tectosilicate compound is dried in an oven at 110° C. for 5 hours.

\* \* \* \* \*